United States Patent
Bacardit et al.

(10) Patent No.: US 6,848,257 B2
(45) Date of Patent: Feb. 1, 2005

(54) MASTER CYLINDER COMPRISING A FLUID AND REPLENISHING SEAL

(75) Inventors: Juan Simon Bacardit, Barcelone (ES); Bruno Berthomieu, Barcelone (ES); Fernando Sacristan, Barcelone (ES)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/469,460

(22) PCT Filed: Jan. 25, 2002

(86) PCT No.: PCT/FR02/00324
§ 371 (c)(1),
(2), (4) Date: Aug. 29, 2003

(87) PCT Pub. No.: WO02/064410
PCT Pub. Date: Aug. 22, 2002

(65) Prior Publication Data
US 2004/0079078 A1 Apr. 29, 2004

(30) Foreign Application Priority Data
Feb. 9, 2001 (FR) .......................................... 01 01897

(51) Int. Cl.$^7$ ............................................... B60T 11/28
(52) U.S. Cl. .............................. 60/562; 60/588; 60/589
(58) Field of Search ........................... 60/562, 588, 589

(56) References Cited

U.S. PATENT DOCUMENTS

| 4,429,531 A | * | 2/1984 | Spielmann | .................... 60/588 |
| 4,685,301 A | * | 8/1987 | Bacardit et al. | ............... 60/589 |
| 6,425,245 B1 | * | 7/2002 | Attard | ......................... 60/589 |

* cited by examiner

Primary Examiner—F. Daniel Lopez

(57) ABSTRACT

A master cylinder (10) having an axial body (12) with a bore (14) for receving a piston (16, 18), a front seal (26, 28) and a rear seal (30, 32) to delimit a rear supply chamber (34, 38) from a front pressure chamber (36, 40). A supply duct (42, 48) in the body (12) that connects a reservoir to the rear supply chamber (34, 38) has an opening between the front seal (26, 28) and the rear seal (26, 28). The front seal (26, 28) is mounted in a groove (110, 112) of the body (12) and has an interior lip that contacts the piston (16, 18) and lifts off the piston (16, 18) as the piston (16, 18) returns from a position of application to a position of rest to allow hydraulic fluid to be resupply the front pressure chamber (36, 40).

11 Claims, 11 Drawing Sheets

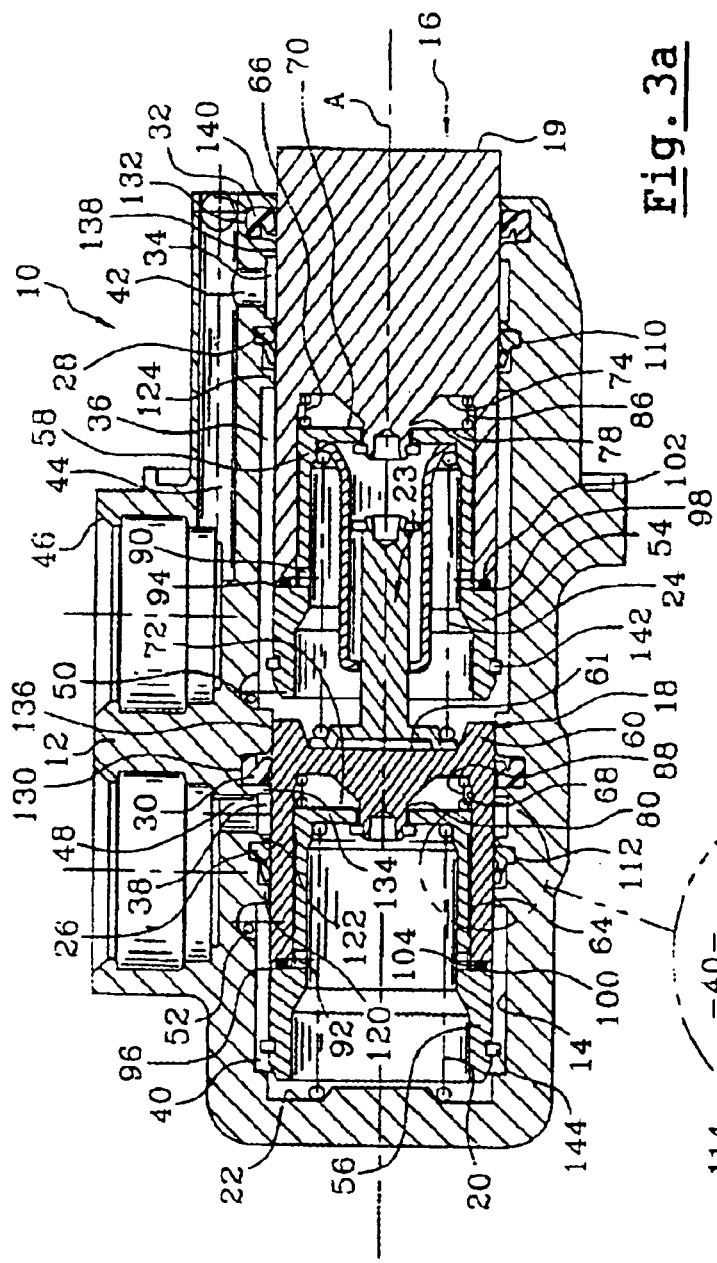
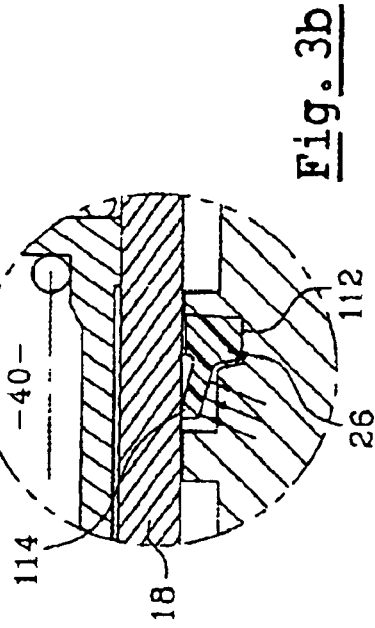
Fig. 3a
Fig. 3b

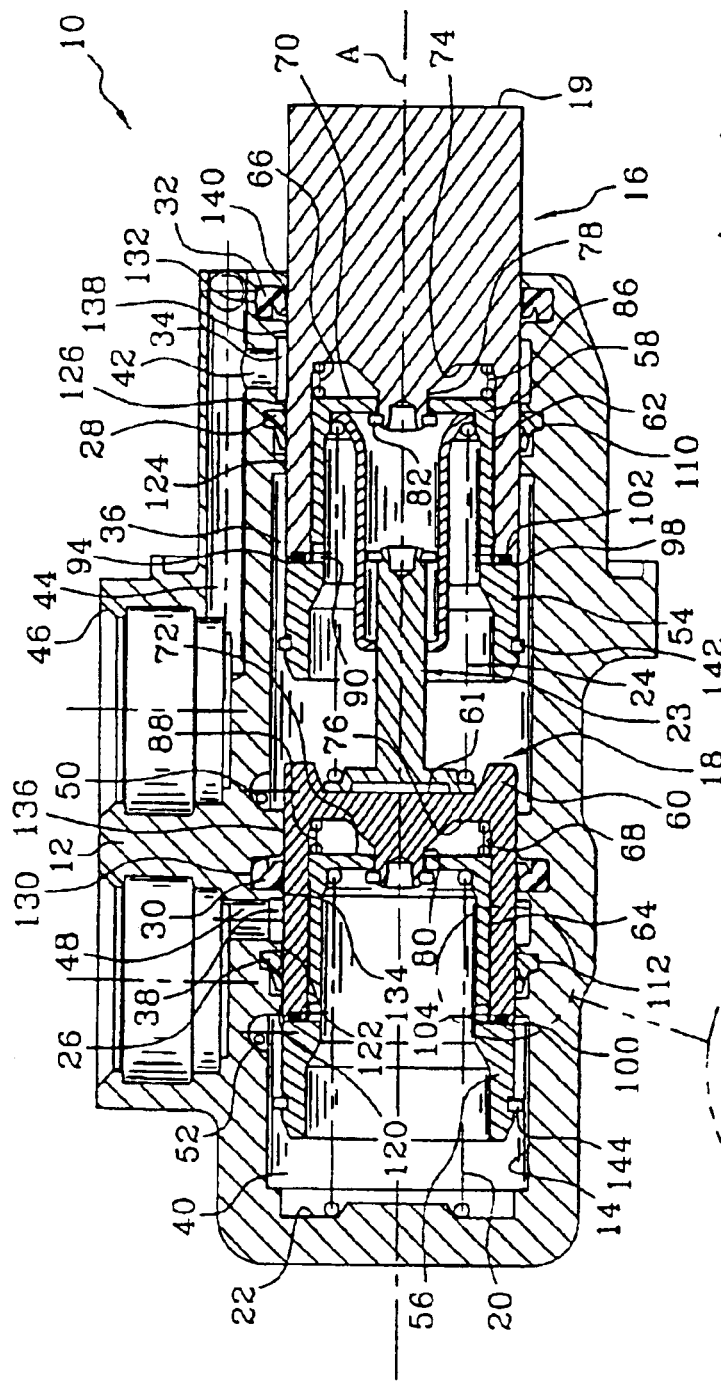
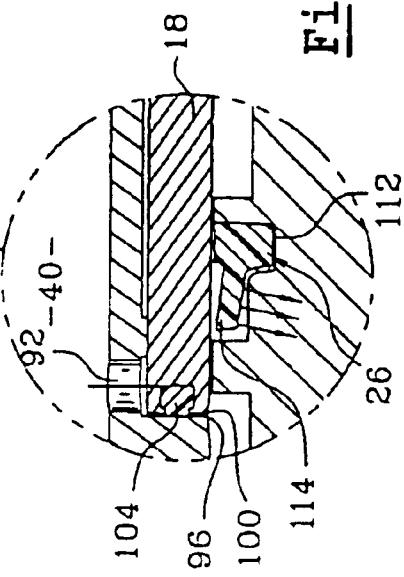
Fig. 4a
Fig. 4b

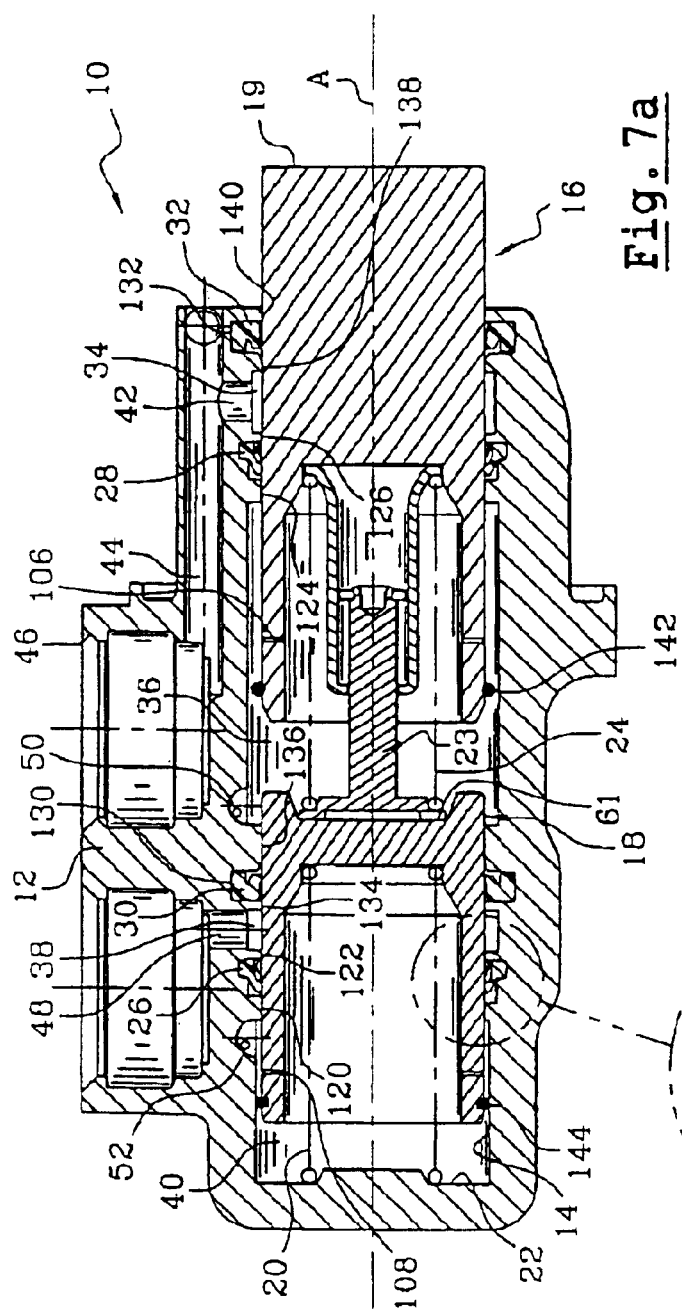
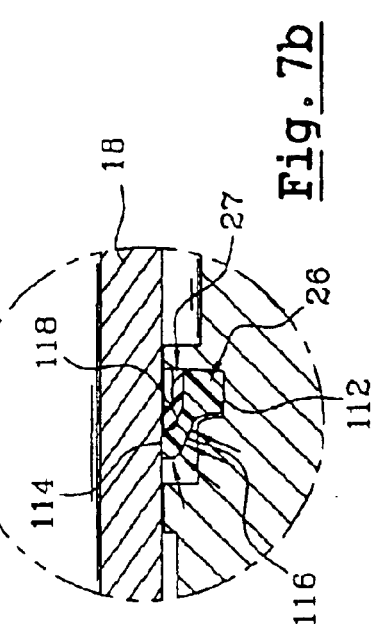
Fig. 7a
Fig. 7b

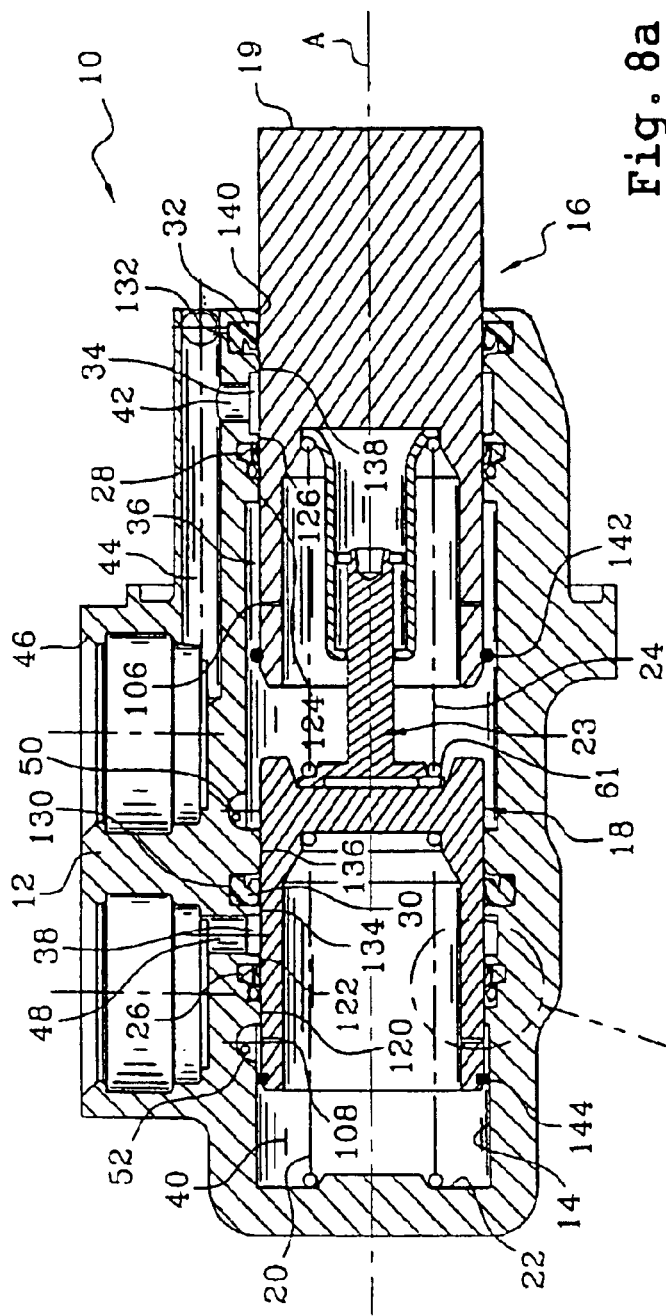
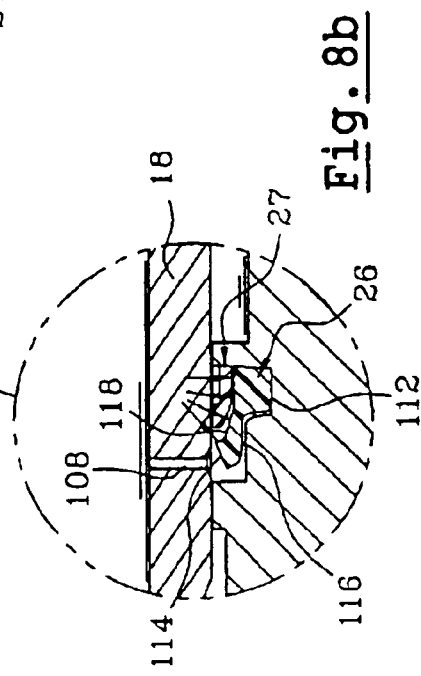
Fig. 8a
Fig. 8b

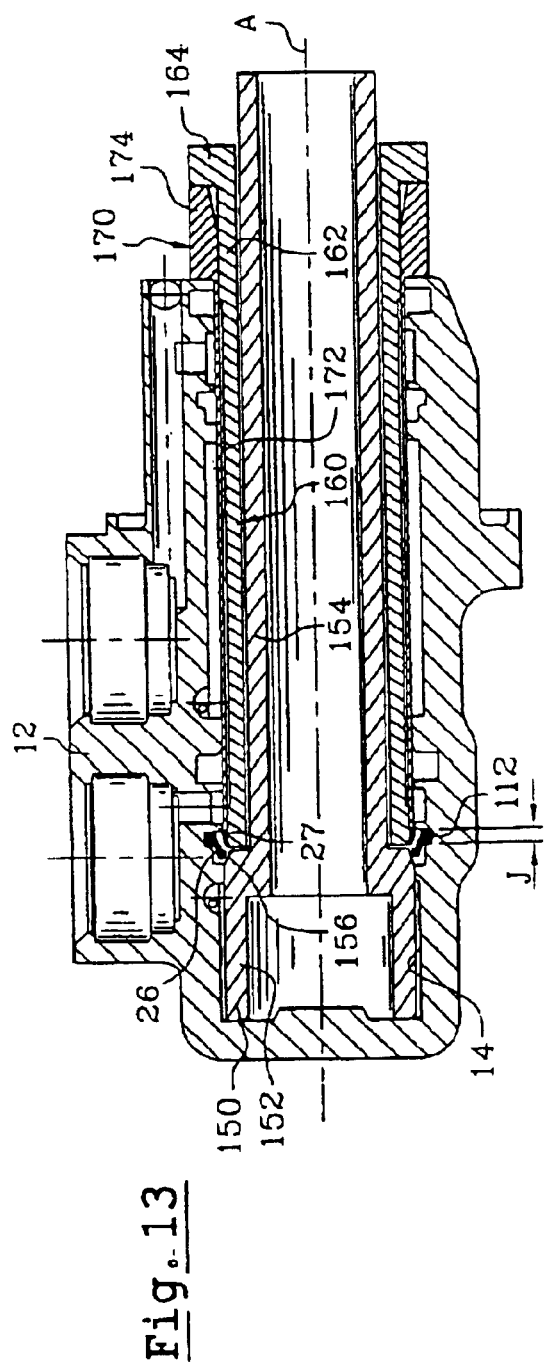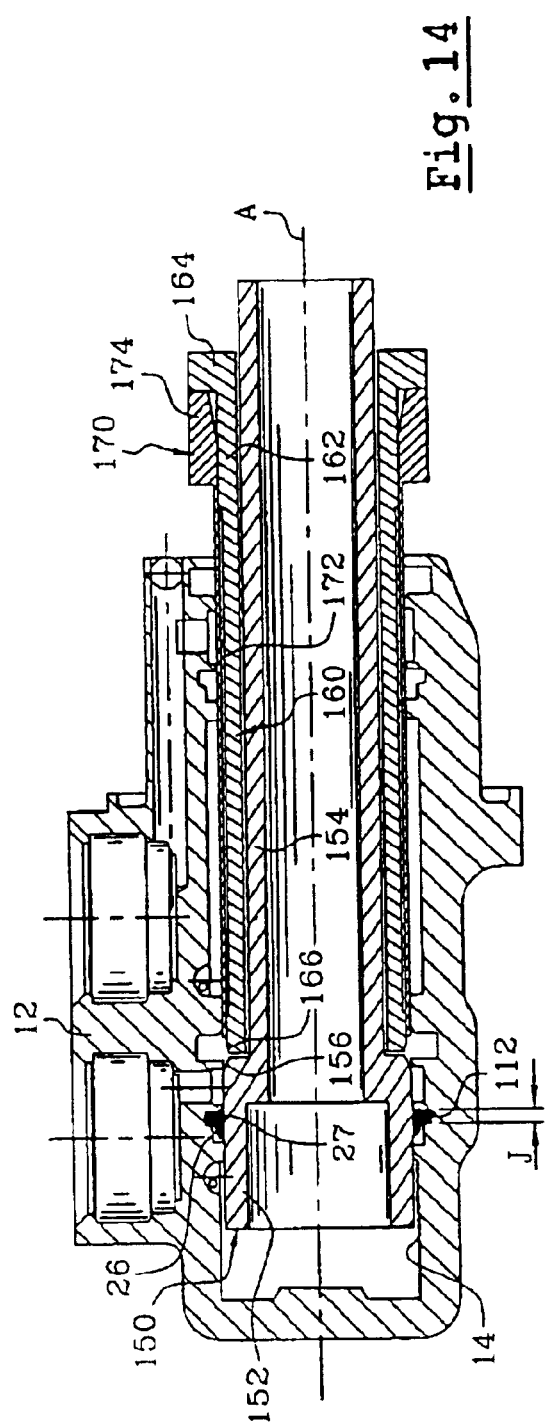

MASTER CYLINDER COMPRISING A FLUID AND REPLENISHING SEAL

The invention relates to a sealing arrangement for a master cylinder for a motor vehicle.

BACKGROUND OF THE INVENTION

The invention relates more particularly to a brake master cylinder for a motor vehicle, of the type which comprises an essentially axial body inside a bore of which is slideably mounted at least one axial piston which is capable of being actuated by a driver of the vehicle between a rear position of rest and a forward position of application of a braking force, and which is returned elastically to its rear position of rest against a stop formed in the body, of the type in which the bore comprises two sealing means, front and rear, which are interposed between the piston and the bore, the front sealing means delimiting. In the bore, a rear supply chamber and a front pressure chamber, of the type in which the body comprises a radial supply duct which connects an external reservoir of hydraulic fluid to the rear supply chamber and which opens between the two sealing means, of the type in which the body has a drilling for supplying a braking circuit which opens into the front pressure chamber, of the type which comprises means for placing the front pressure chamber and the rear supply chamber in communication, which means are capable of being inhibited by the piston when it is moved axially forward towards its position of application in order to isolate the front pressure chamber from the rear supply chamber and thus allow a braking pressure to become established in the front pressure chamber.

Numerous examples of brake master cylinders of this type are known.

In most master cylinders of this type, at least one of the two sealing means is carried by the piston. It is therefore subjected to significant wear because of the reciprocating movement that this piston performs in the bore of the body of the booster during successive braking operations.

This wear is likely to compromise the sealing of the supply and pressure chambers of the booster, which may have even more serious consequences given that most current master cylinders are designed to have large piston cross sections so as to be able to produce a high braking pressure.

SUMMARY OF THE INVENTION

In order to remedy this drawback, the invention proposes a brake master cylinder of the type described previously, which comprises at least one seal carried by the bore of the body.

To this end, the invention proposes a brake master cylinder of the type described previously, characterized in that the front sealing means comprises a front seal which is mounted in a groove of the body, and of which an interior peripheral lip, arranged in contact with the piston, is capable of lifting off the piston when it returns from its position of application to its position of rest so as to allow the hydraulic fluid, by flowing between the bore and the piston, to resupply the front pressure chamber from the radial supply duct and from the reservoir.

According to other features of the invention:

the body comprises a front pair of annular bearing surfaces which are arranged on each side of the front seal to guide the piston in the bore and which comprise at least one channel along which the hydraulic fluid can flow, the annular bearing surfaces of be front pair comprise a number of helical channels, the piston is one-piece, in particular, tubular, and has at least one duct a first end of which opens into the front pressure chamber and a second end of which opens into the periphery of the piston in such a way as to communicate with the supply chamber when the piston is in the position of rest so as to form the means of communication and so as to communicate with the front pressure chamber when the piston is in the position of application so as to inhibit the means of communication, the seal comprises an interior reinforcing ring which is intended to prevent the seal from becoming extruded as the piston passes the second end of the duct, the ring is made of a fairly elastic material, and it comprises a frustoconical bearing surface and an axial slot arranged on its periphery and which are intended to make it easier to fit, the ring comprises at least one axial slot arranged on the interior face of its periphery, the ring is made of an elastomeric material, the piston comprises a front portion and a rear portion which are tubular and of the same outside diameter, a rear bearing surface of the front portion sliding in a bore of the rear portion, and retaining means and elastic urging means are interposed between a rear face of the front portion and the closed and of the bore of the rear portion, the front portion comprises at least one duct a first end of which opens into the front pressure chamber and a second end of which opens into the periphery of the rear bearing surface between a shoulder rear face of the front portion and a shoulder front face of the rear portion to form a moving valve which, when the piston is in the position of rest, opens into the supply chamber and constitutes the means of communication, the shoulder front face of the rear portion has an annular seal, the rear sealing means consists of a rear seal which is mounted in a groove of the body and of which an interior peripheral lip is arranged in contact with the piston, the body comprises a rear pair of annular, bearing surfaces which are arranged on each side of the rear seal to guide the piston in the bore, the piston at its end comprises an external elastic ring which is capable, when the piston is in the position of rest, of coming into contact with a front shoulder face of the front annular bearing surface of the front pair of annular bearing surfaces forming a stop, the piston is elastically returned to its rear position of rest by a spring, the master cylinder is a master cylinder of the "tandem" type which comprises, from the rear forward two pistons, primary and secondary, which delimit in the bore of the body primary and secondary supply chambers and primary and secondary pressure chambers, the primary piston being returned elastically to its rear position of rest by a spring bearing between a rear face of the secondary piston and a front face of the primary piston.

Other features and advantages of the invention will become apparent from reading the detailed description which follows, for an understanding of which reference will be made to the appended drawings.

BRIEF DESCRIPTION OF THE DRAWINGS

FIG. 3a is a view of the master cylinder of FIG. 1a depicted in the position of application of a braking force;

FIG. 4a is a view of the master cylinder of FIG. 1a depicted in the reservoirs and radial supply ducts resupply position;

FIG. 7a is a view of the master cylinder of FIG. 5a depicted in the position of application of a braking force;

FIG. 8a is a view of the master cylinder of FIG. 5a depicted in the reservoirs and radial supply ducts resupply position;

FIGS. 1b to 8b are detail views of the front seal associated with the secondary piston according to FIGS. 1a to 8a;

FIGS. 12 to 14 are views in axial section illustrating three successive stages in the fitting of a reinforcing ring of the seal of FIG. 2a inside the bore of the master cylinder.

DETAILED DESCRIPTION OF THE INVENTION

Figure 1A:
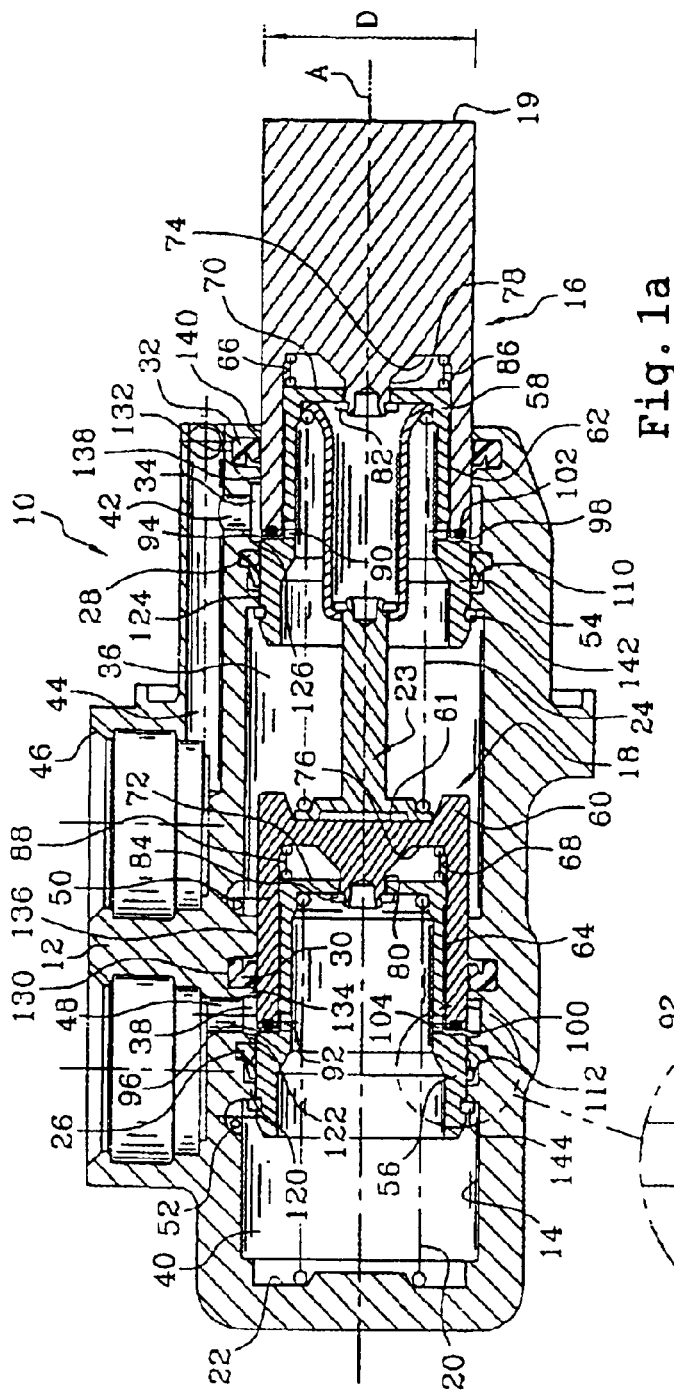
FIG. 1a is a view in axial section of a first embodiment of a master cylinder of the "tandem" type according to the invention, depicted in the position of rest.

In the description which will follow, identical reference figures denote parts which are identical or have similar functions. By convention, the terms "front" and "rear" respectively denote elements or positions facing, respectively, towards the left and towards the right in the figures.

FIGS. 1a to 8a depict the entirety of a brake master cylinder for a motor vehicle.

In a known way, in the preferred embodiments of the invention, the master cylinder 10 is a master cylinder of the "tandem" type which comprises an essentially axial body 12 of axis A inside a bore 14 of which two axial pistons 16 and 18 are slideably mounted.

This configuration is not, however, a limitation on the invention and the master cylinder 10 could be a simple master cylinder with just one sliding piston.

The piston 16, known as the primary piston 16, is intended to allow a hydraulic pressure to become established in a primary braking circuit of the vehicle (not depicted), and the piston 18, known as the secondary piston 18, is intended to allow a hydraulic pressure to become established in a secondary braking circuit of the vehicle (not is depicted) which is independent of the primary braking circuit of the vehicle.

The primary piston 16 can be actuated directly by a driver of the vehicle. For example, a rear end 19 of the primary piston 16 can be connected to a booster (not depicted) which amplifies the forces exerted on a brake pedal of the vehicle.

The secondary piston 18 can be actuated indirectly by the driver of the vehicle, particularly by the primary piston 16 in a way which will be described in greater detail later on.

Figures 5A, 5B:
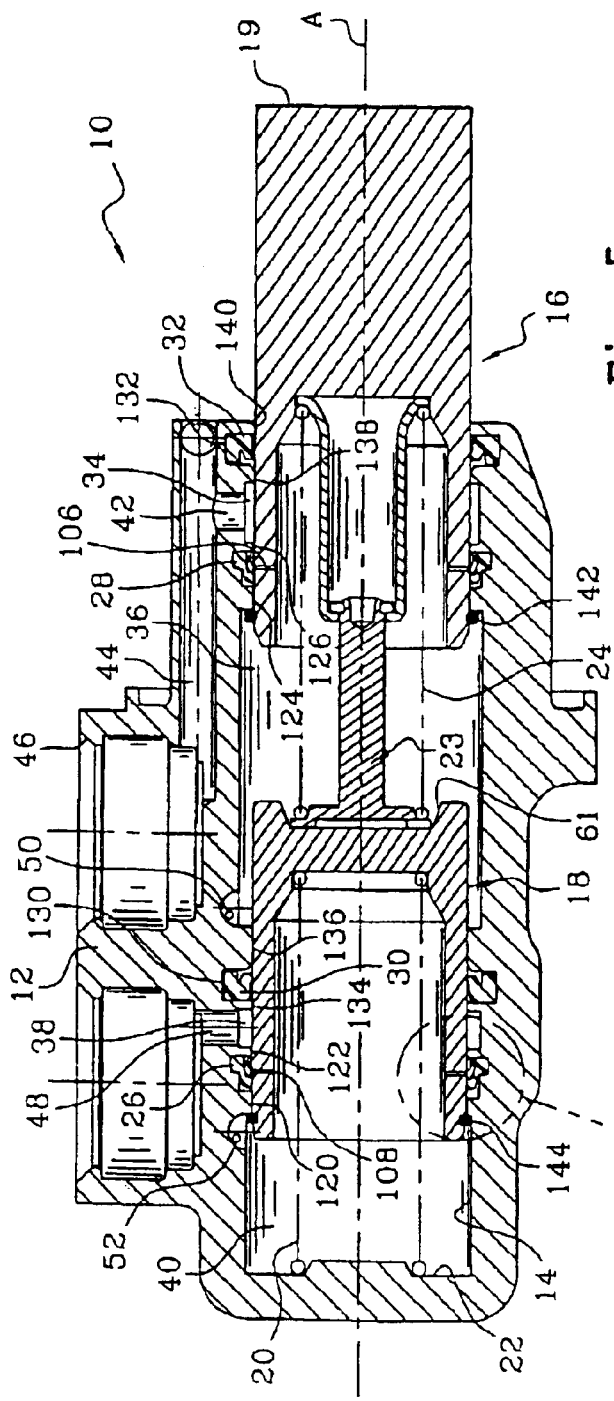
FIG. 5a is a view in axial section of a second embodiment of a master cylinder of the "tandem" type according to the invention depicted in the position of rest.

Each primary 16 or secondary 18 piston can thus move between a rear position of rest, which is depicted in FIGS. 1a and 5a, and a forward position of application of a braking force, which is depicted in FIGS. 3a and 7a, passing through intermediate positions which will be described later on.

In the known way each primary 16 or secondary 18 piston is returned elastically to its rear position of rest against a stop which is formed in the body 14 and which will be described later on.

In particular, the secondary piston 18 is returned to the rear by a spring 20 which bears against a transverse front end face 22 of the bore 14 and against the secondary piston 18, and the primary piston 16 is returned elastically to the rear by a spring 24 which bears on a transverse rear face 61 of the secondary piston 18 and on the primary piston 16. More specifically, as the spring 24 is, in particular, of great length, it is mounted around a sliding ram 23 which is interposed between the transverse rear face 61 of the secondary piston 18 and the primary piston 16.

The bore 14 comprises two primary sealing means, front 28 and rear 32, which are interposed respectively between the primary piston 16 and the bore 14, and two secondary sealing means, front 26 and rear 30, which are interposed respectively between the secondary piston 18 and the bore 14.

In consequence, the front primary sealing means 28 delimits, in the bore 14, a rear supply chamber 34 and a front pressure chamber 36. Likewise, the front secondary sealing means 26 delimits in the bore 14 a rear supply chamber 3B and a front pressure chamber 40.

The body 12 has a primary radial supply duct 42 which connects a primary external reservoir (not depicted) of hydraulic fluid to the rear primary supply chamber 34 and which opens between the two primary sealing means 28 and 32.

In particular, the primary radial duct 42 is, for example, connected via an intermediate longitudinal duct 44 to an orifice 46 which opens to the outside of the body 14 and which is intended to take an outlet (not depicted) of the associated primary reservoir.

The body 12 comprises a secondary radial supply duct 48 which connects a secondary external reservoir (not depicted) of hydraulic fluid to the secondary rear supply chamber 38 and which opens between the two secondary sealing means 26 and 30.

The body has two drillings, primary 50 and secondary 52, for supplying the associated primary and secondary braking circuits which open into the associated primary 36 and secondary 40 front pressure chambers.

In the known way, the master cylinder 10 comprises means for placing each front primary 36 and secondary 40 pressure chamber in communication with the associated rear primary 34 and secondary 38 supply chamber. These means of communication can be inhibited by the associated primary 16 and secondary 18 piston when it is moved axially forward to its position of application to isolate the front primary 36 or secondary 40 pressure chamber from the associated rear primary 34 or secondary 38 supply chamber, and thus allow a braking pressure to become established in the associated front primary 36 or secondary 40 pressure chamber.

According to a first embodiment of the invention which is described in FIGS. 1a to 4a and 1b to 4b, each primary 16 and secondary 18 piston has an associated front portion 54, 56 and an associated rear portion 58, 60 which are tubular and have the same outside diameter "D" and it comprises a rear bearing surface 62, 64 of the front portion 64, 66 which slides in a bore 66, 68 of the rear portion 58, 60.

Retaining means and elastic urging means are interposed between a rear face 70, 72 of each front portion 54, 56 and the closed end 74, 76 of the bore of the rear portion 58, 60.

In particular, each rear portion 58, 60 has, for example a cylindrical bearing surface 78, 80 for guidance which passes through the wall associated with the rear face of the associated front portion and a front end of which has a stop means 82, 84 to form the retaining means.

Furthermore, a spring 86, 88 is interposed between each rear face 70, 72 of each front portion 54, 56 and the closed end 74, 76 of the bore of the rear portion 58, 60.

As illustrated by FIGS. 1a to 4a and more particularly by FIGS. 1b to 4b, in order to form the means of communication of the front pressure and rear supply chambers, each front portion 54, 56 comprises at least one duct 90, 92, a first end of which opens into the associated front pressure chamber 36, 40 and a second end of which opens into the periphery of the rear bearing surface 62, 64 between a shoulder rear face 94, 96 of the front portion and shoulder front face 98, 100 of the rear portion 58, 60 to form a moving valve which, when the piston 16, 18 is in the position of rest, opens into the supply chamber 36, 40 and allows communication between the front chambers 36, 40 and the rear chambers 34, 38.

Advantageously, the shoulder front face 98, 100 of each rear portion 68, 60 comprises an annular field 102, 104 made of elastomeric material which allows this valve to be sealed shut.

The forward movement of each rear portion 58, 60 therefore allows the associated valve to be closed and the associated front chamber 36, 40 to be isolated, which allows the pressure of the hydraulic fluid to rise.

According to a second embodiment of the invention which is described in FIGS. 6a to 8a and 8b to 8b, each piston 16, 18 is one piece and, in particular, tubular. To form the means of communication, each piston 16, 18 has at least one duct 106, 108, a first end of which opens into the front pressure chamber 36, 40 and a second end of which opens into the periphery of the piston 16, 18 so as to communicate with the supply chamber 34, 38 when the piston 16, 18 is in the position of rest and so as to communicate with the front pressure chamber 36, 40 when the piston is in the position of application. Thus, when each piston 16, 18 is in the position of rest, the duct 106, 108 is arranged axially at the rear supply chamber 34. 38 and, when the piston 16, 18 is in the forward position depicted more specifically in FIG. 7a, the duct 106, 108 is arranged axially at the front pressure chamber, that is to say on the other side of the front sealing means 28, 26 with respect to the position of rest of the piston 16, 18, which therefore allows the associated front pressure chamber 36, 40 to be isolated and hence allows the pressure of the hydraulic fluid to rise.

According to the invention, and irrespective of the chosen embodiment of the invention, the front sealing means 28, 26 is comprises [sic] a front seal 28, 26 which is fitted in an associated groove 110, 112 of the body 12. An interior peripheral lip of the front seal 28, 26, arranged in contact with the piston 16, 18, is capable of lifting off the piston 16, 18 when it returns from its position of application to its position of rest so as to allow the hydraulic fluid, by flowing between the bore 14 and the piston 16, 18, to resupply the front pressure chamber 36, 40 from the radial supply duct 42, 48 and from the reservoir.

By way of example, the lip 114 of the front seal 26 associated with the secondary piston 18 is depicted in FIGS. 1b to 8b.

Figure 11:
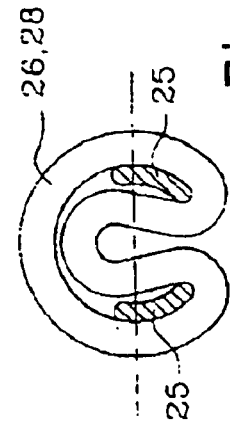
FIG. 11 is an end-on view of a seal and of the tool used to fit it, these being depicted prior to the fitting of the seal.

As illustrated in FIG. 11, each seal 26, 28 may be rolled up on itself beforehand, essentially into a "kidney bean" shape and held in this configuration using pliers (not depicted), the jaws 25 of which squeeze the seal 26, 28.

The pliers are then introduced into the bore 14 of the body 10 to the point where the seal 26, 28 has axially reached the region of the groove 110, 112, then the jaws 25 are operated so as to release the seal 26, 28, which reverts to its shape and spontaneously positions itself in the groove 110, 112.

In the second embodiment which is depicted in FIGS. 5a to 8a and 5b to 8b, each seal 26, 28 comprises a recess which is arranged to the rear of its lip and which is intended to house an interior reinforcing ring 27. This interior reinforcing ring 27 is intended to prevent the seal 26, 28 from becoming extruded, as will be seen later on.

Figure 10:
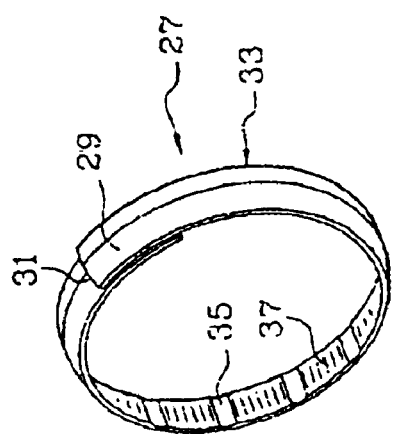
FIG. 10 is a perspective view of the reinforcing ring.

The ring 27 is depicted more specifically in FIG. 10.

Advantageously, the ring is made of a fairly elastic material, and comprises a frustoconical bearing surface 29 and an axial slot 31 arranged on its periphery 33 and which are intended to make it easier to fit, as will be seen later on with reference to FIGS. 12 to 14.

Advantageously, the ring may have axial channels 35 arranged on the interior face 37 of its periphery 33.

Advantageously, in the preferred embodiment of the invention, the ring 27 is made of an elastomeric material.

Figure 1B:
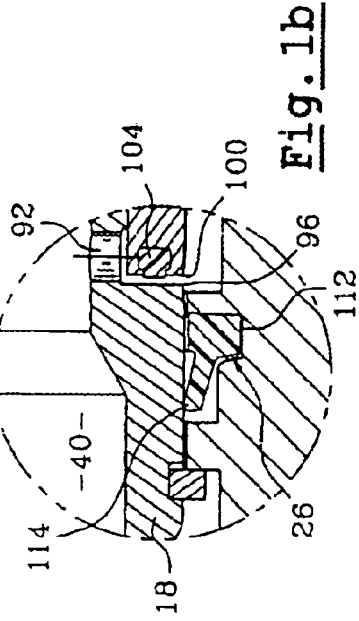

As can be seen in FIGS. 1a and 5a, when each piston is in the position of rest, the lip of the front seal 26 is in contact with the periphery of the piston 18, and the lip of the front seal 28 is in contact with the periphery of the piston 16. In this configuration, as the rear supply chambers 34, 38 are in communication with the front chambers 36, 40, the seal is subjected to equal pressure on each of its faces. FIGS. 1b and 5b more specifically illustrate the detail of the lip 114 of the front seal 26 which is in contact with the piston 18.

In the second embodiment of the invention, as can be seen in FIG. 5a, an interior rear face 118 of the seal 26 does not touch the ring 27 which allows hydraulic fluid to flow.

Figure 2A:
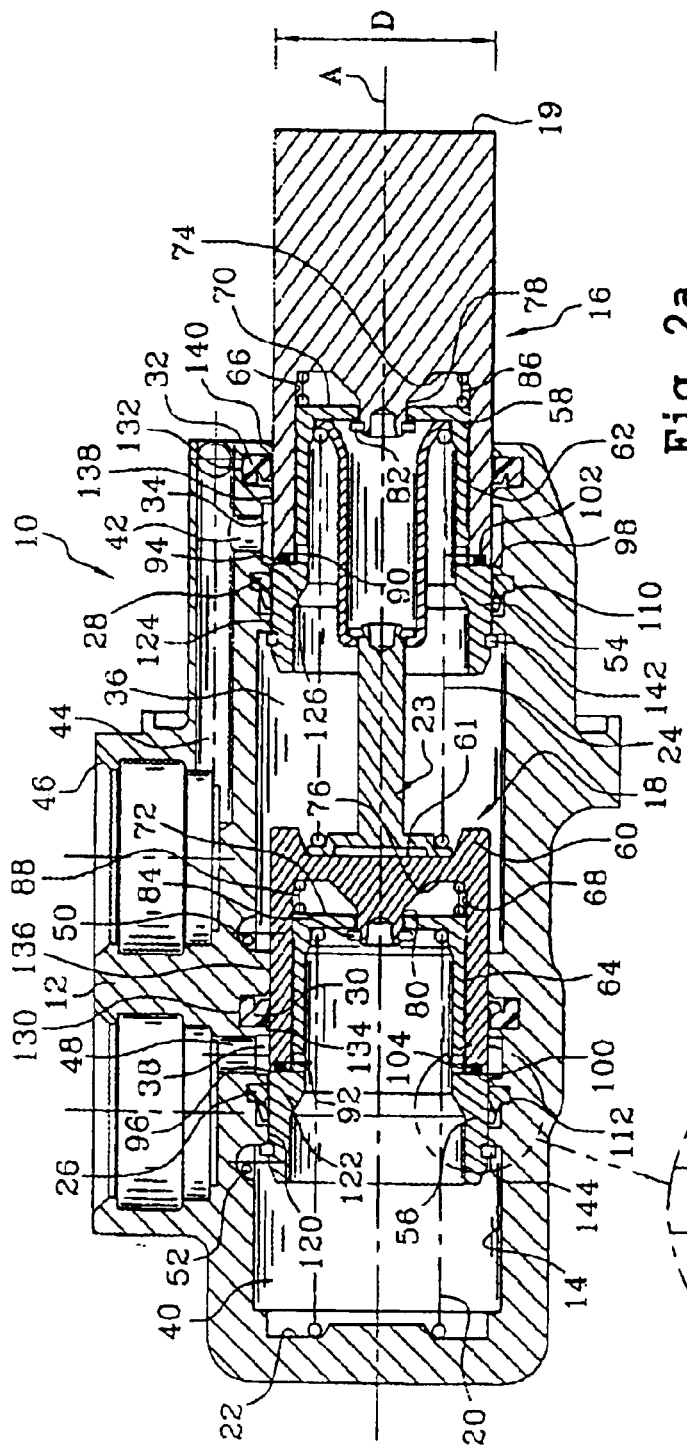
FIG. 2a is a view of the master cylinder of FIG. 1a depicted in the position in which the two means of communication are inhibited.
Figure 2B:
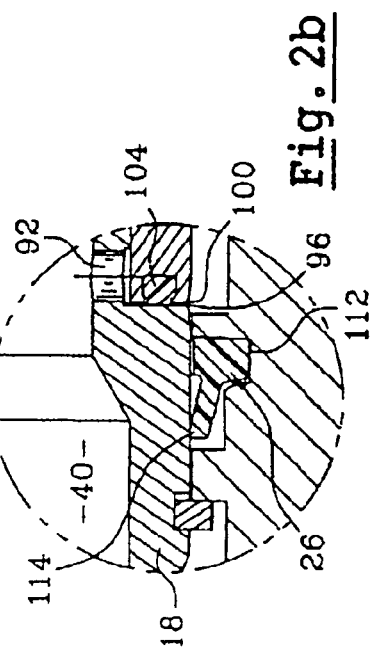
Figure 6A:
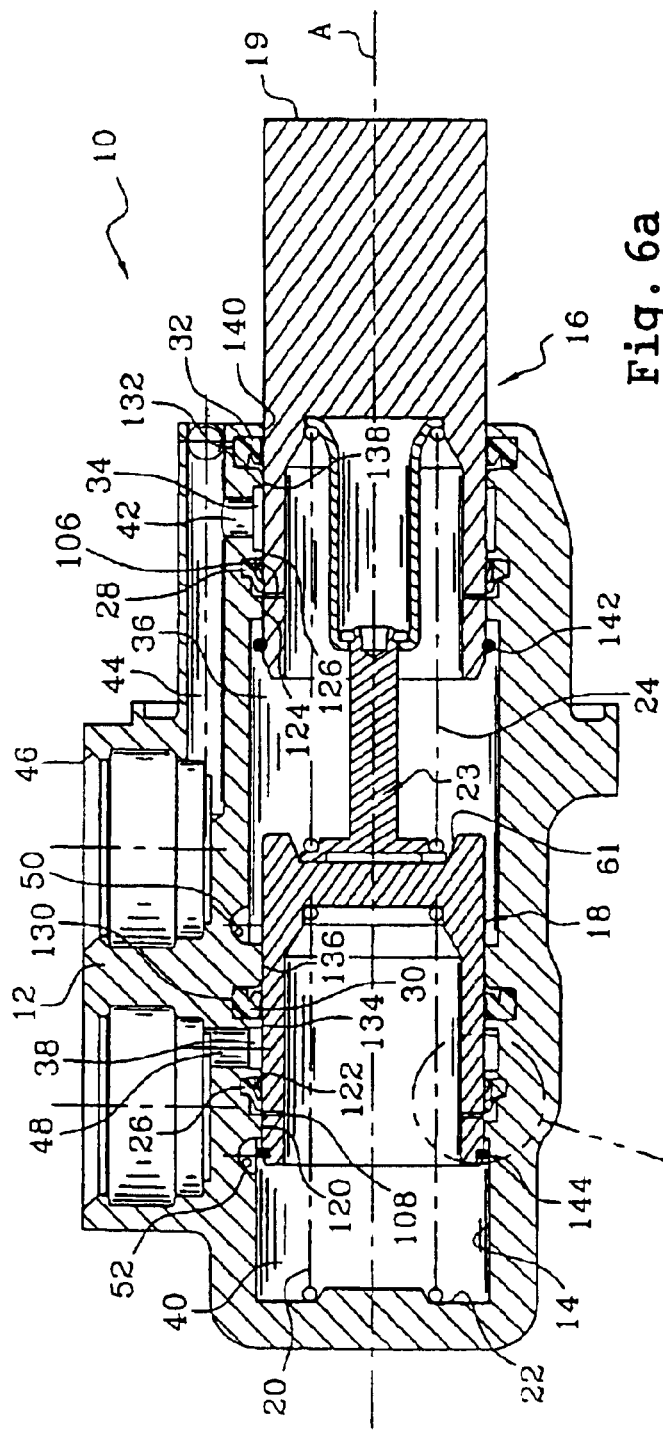
FIG. 6a is a view of the master cylinder of FIG. 5a depicted in the position in which the two means of communication are inhibited.

FIGS. 2a and 6a depict a position in which the means of communication are inhibited.

According to the first embodiment, as illustrated in FIG. 2a, the forward movement of the primary piston 16 has caused the duct 90 associated with the piston 16 to be shut off by pressing the annular seal 102 against the shoulder rear face 94 of the front portion 54 of the piston 16. This causes a slight rise in pressure of the hydraulic brake fluid in the front pressure chamber 36, which pushes the secondary piston 18 back and causes the duct 92 associated with the piston 18 to be shut off by pressing the annular seal 104 hard against the shoulder rear face 96 of the front portion 56 of the piston 18.

In this configuration, the front faces of the seals 28 and 26 are subjected to a pressure which presses them hard against the periphery of the respective pistons 16 and 18. The arrows in FIG. 3b illustrate the action of the pressure forces on the front face 116 of the lip 114 of the seal 26.

According to the second embodiment, as illustrated by FIG. 6e, the forward movement of the primary piston 16 has caused the duct 106 associated with the piston 16 to be shut off, which duct has moved forward into a position with respect to the front seal 28 which is the opposite of the one it occupied previously when the piston 16 was in the position of rest.

This causes a slight increase in the pressure of the hydraulic brake fluid in the front pressure chamber 36, which pushes the secondary piston 18 back and cause the duct 108 associated with the piston 18 to be shut off. The duct 108 associated with the piston 18 in turn advances as far as a position with respect to the front seal 26 which is the opposite of the one it occupied previously in the position of rest. In this configuration, the front faces of the seals 28 and 26 are subjected to a pressure which presses them hard against the periphery of the respective pistons 16 and 18.

Figure 6B:
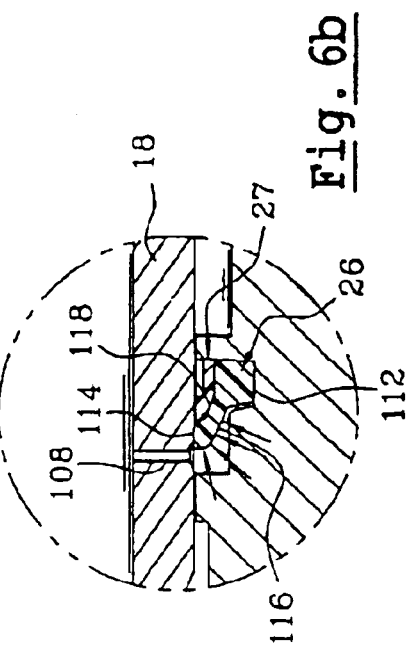

FIG. 6b illustrates the action of the pressure forces, depicted by arrows, on the front face 116 of the lip 114 of the seal 26. The pressure forces press the lip 116 of the seal 26 hard against the piston 18 and press the interior rear face 118 of the seal 26 hard against the ring 27, thus guaranteeing the seal.

FIGS. 3a and 7a depict a position of application of a braking force by the pistons 16 and 18.

The advancing of the primary pistons 16 and 18 has caused the ducts 90, 9 associated with the first embodiment and the ducts 106, 108 associated with the second embodiment to be shut off. Each of these ducts has moved forward into a position with respect to the respective front seal 26, 28 which is the opposite to the one it occupied previously in the position of rest. The hydraulic brake fluid is under pressure in the two front chambers 36 and 40.

In this configuration, the front faces of the seals 28 and 2E are subjected to a pressure which presses them hard against the periphery of the respective pistons 16 and 18. The arrows in FIG. 3b illustrate the action of the pressure forces on the front face 116 of the lip 114 of the seal 26 associated with the first embodiment. FIG. 7b illustrates the action of the pressure forces, represented by arrows, on the front face 116 of the lip 114 of the seal 26 associated with the second embodiment. These pressure forces press the lip 116 of the seal 26 hard against the piston 18 and press the interior rear face 118 of the seal 26 hard against the ring 27, thus guaranteeing a good seal.

FIGS. 4a and 8a depict a position of resupply of the front chambers 36, 40 by the radial ducts 42, 48 and the associated reservoirs (not depicted) when the driver relaxes his force on the end 19 of the primary piston 16.

In this configuration, the two pistons 16 and 18 retreat rapidly and a depression becomes established in the primary 36 and secondary 40 front pressure chambers. This depression lifts the lips of the seals 26 and 28.

As can be seen, for example, in FIGS. 4b and 5b, the depression forces, represented by arrows, tend to lift the lip 114 of the seal 26, which allows the hydraulic fluid to run from the duct 48 towards the secondary front pressure chamber 40, flowing between the bore 14 and the periphery of the piston 18.

In the particular case of the second embodiment of the invention, depicted in FIG. 8b, the depression forces lift the lip 116 off the piston 18 and lift the interior rear face 118 of the seal 26 off the ring 27, which more particularly allows the hydraulic fluid to run from the duct 48 towards the secondary front pressure chamber 40, flowing between the rear face 118 of the seal 26 and the ring 27.

In the two embodiments of the invention, as illustrated by FIGS. 1a to 9a, the body 12 preferably comprises a front pair of annular bearing surfaces 120, 122 which are arranged one on each side of the front seal 26 associated with the piston 18, and a front pair of annular bearing surfaces 124, 126 which are arranged one on each side of the front seal 28 associated with the piston 16.

These bearing surfaces 120, 122, 124, 126 allow the pistons 16, 18 to be guided in the bore 14. Each of these annular bearing surfaces 120, 122, 124, 126 comprises at least one channel 128 for the flow of the hydraulic fluid. This configuration makes it possible to offer accurate guidance of the piston 16, 18 while at the same time allowing the radial duct 42, 48 to be resupplied with a satisfactory delivery.

The ring 27 advantageously makes it possible to prevent the front seal 28 from becoming extruded into at least one channel 128.

Figure 9A:
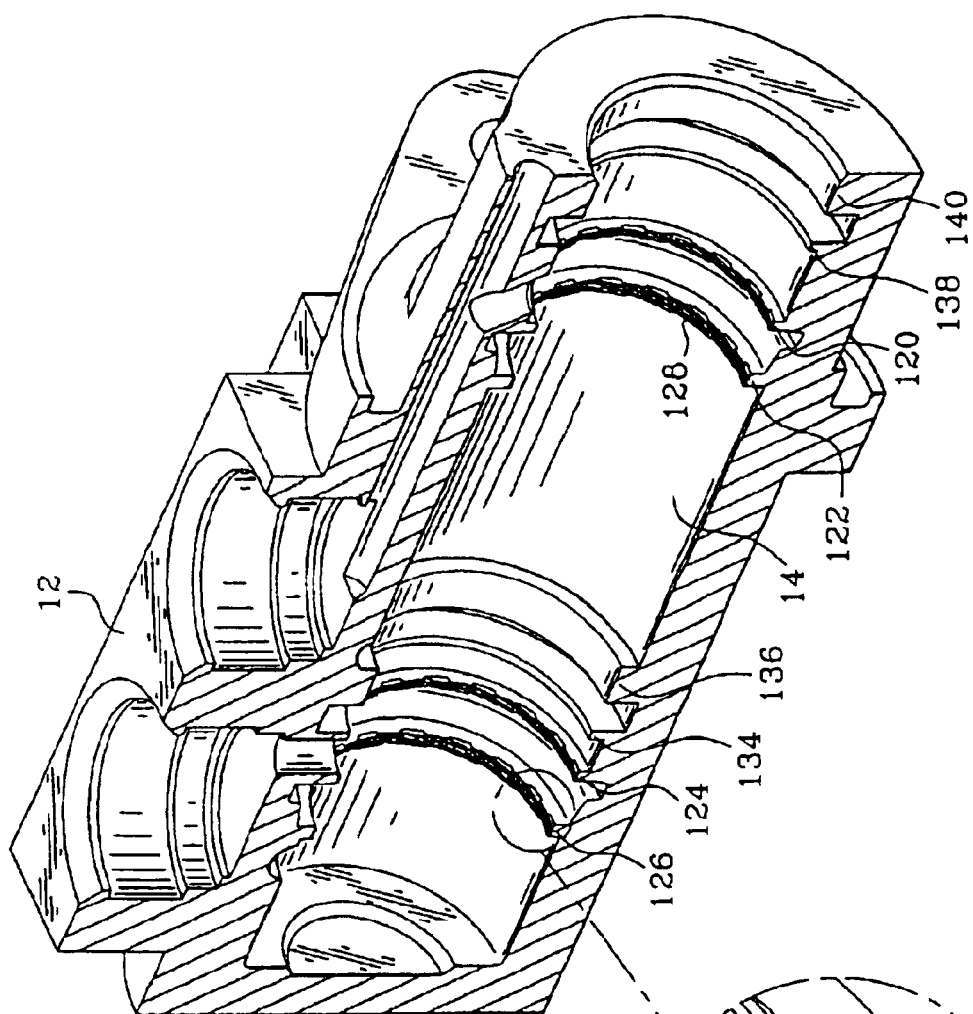
FIG. 9a is a perspective half view of the body of the master cylinder.
Figure 9B:
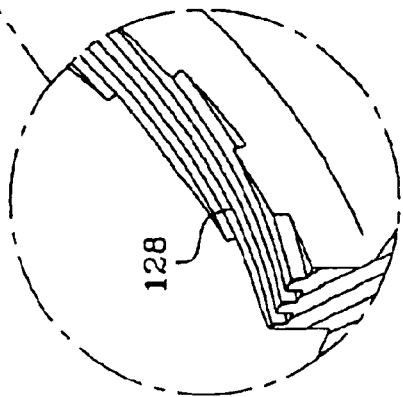
FIG. 9b is a detail view of the helical channels of the body of FIG. 1.

As a preference, as illustrated more specifically in FIG. 9b, the annular bearing surfaces 120, 122 comprise a number of helical channels 124.

Furthermore, as illustrated in FIGS. 1a to 8a, the rear sealing means 30, 32 consists of a rear seal 30, 32 which is mounted in a groove 130, 132 of the body 12 and an interior peripheral lip of which is arranged in contact with the associated piston 16, 18.

Furthermore, as illustrated by FIGS. 1a to 9a, the body comprises the rear pair of annular bearing surfaces 134, 136 which are arranged one on each side of the rear seal 30 associated with the piston 18 and a rear pair of annular bearing surfaces 138, 140 which are arranged one on each side of the rear seal 32 associated with the piston 16. These bearing surfaces 134, 136, 138, 140 allow the associated piston 16, 18 to be guided in the bore 14.

Furthermore, in each of the embodiments, the stop means of the pistons 16, 18 comprise, at the end of each piston, an external elastic ring 142, 144 which is capable, when the piston 16, 18 is in the position of rest, of coming into contact with a front shoulder face of the front annular bearing surface 124, 120 which forms part of the front pair of annular bearing surfaces.

Figure 12:
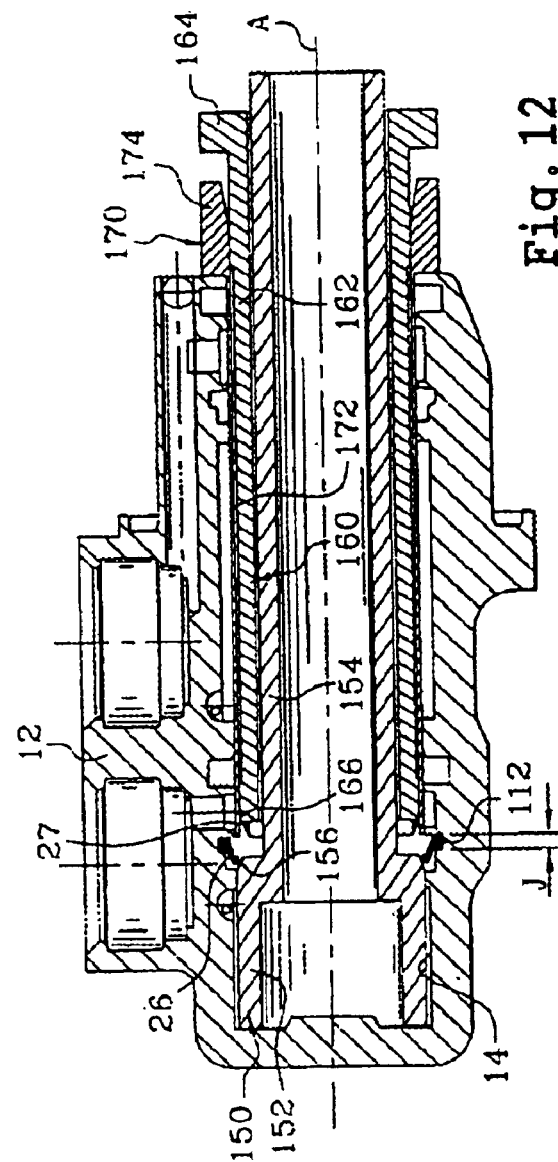

FIGS. 12 to 14 illustrate three successive stages in the fitting into the body 12 of the reinforcing ring 27 associated with the seal 26 of the second embodiment.

For fitting, use is made of three tools, 150, 160 and 170.

The tool 150 is tubular and comprises a front portion 152 which is essentially of the same diameter as the bore 14, and a rear portion 154 which is essentially of a diameter equal to the inside diameter of the reinforcing ring 27 in its compressed state. The tool 150 has a frustoconical chamfer 156 at the rear end of its front portion 152. The length of the front portion 152 is designed so that the rear end of the front portion 152 more or less axially coincides with the groove 112.

The tool 160 is essentially tubular and has a front portion 162 which essentially has the mean diameter of the reinforcing ring 27 in its compressed state. The tool 160 has a frustoconical chamfer 166 at the front end of its front portion 162. It also has a rear portion 164 forming a holding knob, with a greater diameter than the front portion 162.

The tool 170 is essentially tubular and has a front portion 172 which is essentially of an inside diameter equal to the outside diameter of the reinforcing ring 27 in the compressed state. It also has a rear portion 174 forming a holding knob, of a greater diameter than the front portion 172.

The ring 27 is compressed then slipped over the rear portion 154 of the tool 150. The tool 160 is then slipped into an intermediate axial position inside the tool 170 and on the tool 150. The collection of the three tools 150, 160, 170 and of the ring 27 is introduced into the bore 14 of the body 12. The ring 27 is then held axially by the end of the front portion 162 of the tool 160, and is held radially by the front portion 172 of the tool 170, with an axial clearance J between the ring 27 and the front portion 152 of the tool 150, as depicted in FIG. 12.

Then, as illustrated in FIG. 13, the tool 160 is pushed forward again so as to reduce the clearance J. The ring 27 therefore escapes from the front portion 172 and spontaneously readopts its shape pressing against the frustoconical chamfer 166 of the tool 160.

Finally, as illustrated in FIG. 14, the collection of the three tools 150, 160, 170 is removed from the bore 14 of the body 12, the frustoconical chamfer 156 arranged at the rear end of its front portion 152 allowing the tool 150 to pass without destroying the reinforcing ring 27.

The invention therefore makes it possible to have a master cylinder with very reliable sealing.

We claim:

1. A brake master cylinder (10) for a motor vehicle having an axial body (12) with a bore (14) therein that slideably receives at least one axial piston (16, 18), said piston (16, 18) being actuated by a driver of the vehicle between a rear position of rest and a forward position of application to pressurize fluid and create a braking force, said at least one axial piston (16, 18) being elastically urged against a stop formed in said body (121 to define said rear position of rest, said master cylinder (10) having a front sealing means (26, 28) and a rear sealing means (30, 32) that are interposed between said piston (16, 18) and said bore (14), said front sealing means (26, 28) delimiting a rear supply chamber (34, 38) from a front pressure chamber (36, 40) within said bore (14), said body (12) having a radial supply duct (42, 48) that connects an external reservoir of hydraulic fluid to said rear supply chamber (34, 38) and opens between said front sealing means (26, 28) and said rear sealing means (30, 32), said body (12) having a drilling (50, 52) that opens into said front pressure chamber (36, 40) for supplying a braking circuit with pressurized fluid, said master cylinder (10) having means for placing said front pressure chamber (36, 40) in communication with said rear supply chamber (34, 38) with said piston (16, 18) in said rest position and for inhibited said communication when said piston (16, 18) is moved axially forward towards a position of application such that said front pressure chamber (36, 40) is isolated from the rear supply chamber (34, 38) to pressurized fluid in the front pressure chamber (36, 40), characterized in that said front sealing means (26, 28) comprises a front seal (25, 28) that is mounted in a groove (110, 112) of said body (12) said front seal (26, 28) having an interior peripheral lip that contacts said piston (16, 18) and lifts off the piston (16, 18) when the piston (16, 18) returns from a position of application to said position of rest to allow hydraulic fluid to flow between said bore (14) and a number of helical channels (128) and resupply said front pressure chamber (36, 40) from said reservoir by way of said radial supply duct (42, 48), said body (12) having a front pair of annular bearing surfaces (120, 122, 124, 126) located on each side of the front seal (26, 28) to guide said piston (16, 18) in the bore (14), said piston (16, 18) having a front tublar portion (54, 56) and a rear tublar portion (58, 60) having a same outside diameter (D) with a rear bearing surface (62, 64) of said front tubular portion (54, 56) that slides in a bore (66, 68) of said rear portion (58, 60), retaining means (78, 80, 82, 84) and elastic urging means (86, 88) that is interposed between a rear face (70, 72) of said front portion (54, 56) and a closed end (74, 76) of the bore (66, 68) of the rear portion (58, 60).

2. The master cylinder (10) according to claim 1, characterized in that said front tubular portion (54, 56) comprises at least one duct (90, 92) having a first end of which opens into said front pressure chamber (36, 40) and a second end of which opens into the periphery of said roar bearing surface (62, 64) between a shoulder rear face (94, 96) of the front tubular portion (54, 56) and a shoulder on a front face (98, 100) of the rear tubular portion (58, 60) to form a moving valve that opens into the supply chamber (34, 38) to constitute said means of communication when said piston (16, 18) is in the position of rest.

3. The master cylinder (10) according to claim 2, characterized in that said shoulder front face (98, 100) of said rear said tubular portion has an annular seal (102, 104).

4. The master cylinder (10) according to claim 3, characterized in that said the rear sealing means (30, 32) consists of a rear seal (30, 32) which is mounted in a groove (130, 132) of said body (12) and that has an interior peripheral lip that contacts said piston (16, 18).

5. The master cylinder (10) according to claim 4, characterized in that said body (12) has a rear pair of annular bearing surfaces (134, 136, 138, 140) that are arranged one on each side of said rear seal (30, 32) to guide said piston (16, 18) in said bore (14).

6. The master cylinder (10) according to claim 5, characterized in that said piston (16, 18) has an external elastic ring (142, 144) on an end that comes into contact with a front shoulder face of the front annular bearing surface (120, 124) of the front pair of annular bearing surfaces forming a stop in the position of rest.

7. The master cylinder (10) according to claim 6, characterized in that said piston (16, 18) is elastically returned to said position of rest by a spring (20, 24).

8. The master cylinder (10) according to claim 7, characterized by a primary piston (16) and a secondary piston (18) that delimit said bore (14) into primary (34) and secondary (38) supply chambers and primary (36) and secondary (40) pressure chambers, said primary piston (16) being returned elastically to said position of rest by a spring (24) bearing between a rear face (61) of said secondary piston (18) and a front face of said primary piston (16).

9. A brake master cylinder (10) for a motor vehicle, having an essentially axial body (12) with a bore (14) that slidably receives at least one axial piston (16, 18) that is actuated by a driver of the vehicle between a rear position of rest and a forward position of application to pressurize fluid and create a braking force, said at least one axial piston (16, 18) being elastically urged against a stop formed in said body (12) to define said rear position of rest, said master cylinder (10) having a front sealing means (26, 28) and a rear sealing means (30, 32), that are interposed between the piston (16, 18) and the bore (14), the front sealing means (26, 28) delimiting a rear supply chamber (34, 38) from a front pressure chamber (36, 40) within said bore, said body (12) having a radial supply duct (42, 48) that connects an external reservoir of hydraulic fluid to said rear supply chamber (34, 38) and opens between said front sealing means (26, 28) and said rear sealing means (30, 32), said body (12) has a drilling (50, 52) that opens into said front pressure chamber (36, 40) for supplying a braking circuit with pressurized fluid, said master cylinder (10) having means for placing said front pressure chamber (36, 40) in communication with said rear supply chamber (34, 38) with said piston (16, 18) in said rest position, and for inhibiting said communication when said piston (16, 18) is moved axially forward towards its position of application such that said front pressure chamber (36, 40) is isolated from the rear supply chamber (34, 38) to allow pressured fluid in the front pressure chamber (36, 40), characterized in that said front sealing means (26, 28) comprises a front seal (26, 28) that is mounted in a groove (110, 112) of said body (12), said front seal (26, 28) having an interior peripheral lip that contacts said piston (16, 18) and lifts off the piston (16, 18) when said piston (16, 18) returns from its position of application to its position of rest to allow hydraulic fluid to flow between said bore (14) and a number of helical channels (128) and resupply the front pressure chamber (36, 40) from the reservoir by way of said radial supply duct (42, 48), said body (12) having a front pair of annular bearing surfaces (120, 122, 124, 126) located on each side of the front seal (26, 28) to guide said piston (16, 18) in the bore (14), said body (12) having a front pair of annular bearing surfaces (120, 122, 124, 126) that are arranged on each side of said front seal (26, 28) to guide said piston (16, 18) in the bore (14) and having said helical channels (128), said seal (26, 28) having an interior reinforcing ring (27) that prevents said seal (26, 28) from becoming extruded from said groove (110, 112), said piston (16, 18) being a tubular one-piece member with at least one duct (106, 108) having a first end that opens into said front pressure chamber (36, 40) and a second end that opens into the periphery of said piston (16, 18) in such a way as to form means to communicate with said rear supply chamber (34, 38) when said piston (16, 18) is in said position of rest and to form the means of communication with the front pressure chamber (36, 40) and to inhibit communication with said rear supply chamber (34, 38) when said piston (16, 18) is in the position of application.

10. The master cylinder (10) according to claim 5 characterized in that the ring (27) is made of a fairly elastic material with a frustoconical bearing surface (29) and an axial slot (31) arranged on its periphery (33).

11. The master cylinder according to claim 10, characterized in that the ring (27) has at least one axial slot arranged on the interior face (37) of its periphery (33).

* * * * *